United States Patent
Krenzer

[19]

[11] Patent Number: 6,055,911
[45] Date of Patent: May 2, 2000

[54] WORK TABLE FOR MOTOR VEHICLES

[76] Inventor: Donald L. Krenzer, 7602 Corrinne Pl., San Ramon, Calif. 94583

[21] Appl. No.: 09/262,965

[22] Filed: Mar. 4, 1999

[51] Int. Cl.[7] .................................................. A47B 23/00
[52] U.S. Cl. ............................................................. 108/44
[58] Field of Search ................... 108/42, 44, 7, 108/5, 6; 296/37.14, 65.03

[56] References Cited

U.S. PATENT DOCUMENTS

| | | | |
|---|---|---|---|
| 149,255 | 3/1874 | Semmendinger | 108/7 |
| 3,391,960 | 7/1968 | Megargle et al. | 108/44 X |
| 3,446,469 | 5/1969 | Whitten | 108/44 X |
| 4,326,067 | 4/1982 | Gonzalez | 296/65.03 X |
| 4,805,538 | 2/1989 | Fisher et al. | 108/7 |
| 5,036,776 | 8/1991 | Weyhl et al. | 108/7 |
| 5,338,081 | 8/1994 | Young et al. | 296/37.14 |
| 5,427,033 | 6/1995 | Bly . | |
| 5,443,239 | 8/1995 | Laporte | 296/65.03 X |
| 5,542,360 | 8/1996 | Fleming | 108/44 |
| 5,673,628 | 10/1997 | Boos . | |
| 5,730,066 | 3/1998 | Auten et al. . | |
| 5,771,815 | 6/1998 | Leftwich . | |

*Primary Examiner*—Jose V. Chen
*Attorney, Agent, or Firm*—Thomas R. Lampe

[57] ABSTRACT

A portable adjustable work table for selective attachment to the floor of a motor vehicle includes mounting plates positionable over structure normally employed to hold a vehicle seat in position. The work table includes a frame which is adjustable relative to the floor and a table top movably connected to the support frame to change the location and orientation of the work table relative to the support frame.

18 Claims, 4 Drawing Sheets

6,055,911

WORK TABLE FOR MOTOR VEHICLES

TECHNICAL FIELD

This invention relates to a portable adjustable work table for selective attachment to the floor of a motor vehicle, such as a van, motor home or other type of recreational vehicle. The adjustability features allow the ergonomics of the work table to be maximized.

BACKGROUND OF THE INVENTION

It is known to install work tables of various types in motor vehicles. The following United States patents disclose tables and supports for articles for use with motor vehicles believed to be representative of the current state of the prior art: U.S. Pat. No. 5,771,815, issued Jun. 30, 1998, U.S. Pat. No. 5,427,033, issued Jun. 27, 1995, U.S. Pat. No. 5,673,628, issued Oct. 7, 1997, and U.S. Pat. No. 5,730,066, issued Mar. 24, 1998.

DISCLOSURE OF INVENTION

The present invention relates to a portable adjustable work table for selective attachment to the floor of a motor vehicle which is characterized by its relative simplicity, ease of installation and removal, and versatility. The work table is readily adjustable to provide different configurations. The table is adaptable to different motor vehicle interior layouts and can be readily adjusted to accommodate the needs of the user and maximize table ergonomics.

The portable adjustable work table of the present invention is for selective attachment to the floor of a motor vehicle. The work table includes mounting plate means for engagement with the floor and securement means for selectively securing the mounting plate means to the floor.

A support frame is connected to the mounting plate means and selectively adjustably movable-relative to the mounting plate means. The support frame extends upwardly from the mounting plate means.

A table top having a work surface is connected to and is supported by the support frame, the table top being selectively adjustable relative to the support frame.

The mounting plate means comprises a plurality of mounting plates positionable over vehicle seat securement wells or tubs located in the floor of the vehicle. The securement means comprises securement elements extending downwardly from the mounting plates and engageable with seat mounting structure in the vehicle seat securement wells.

Other features, advantages, and objects of the present invention will become apparent with reference to the following description and accompanying drawings.

BEST MODE FOR CARRYING OUT THE INVENTION

Figure 1:
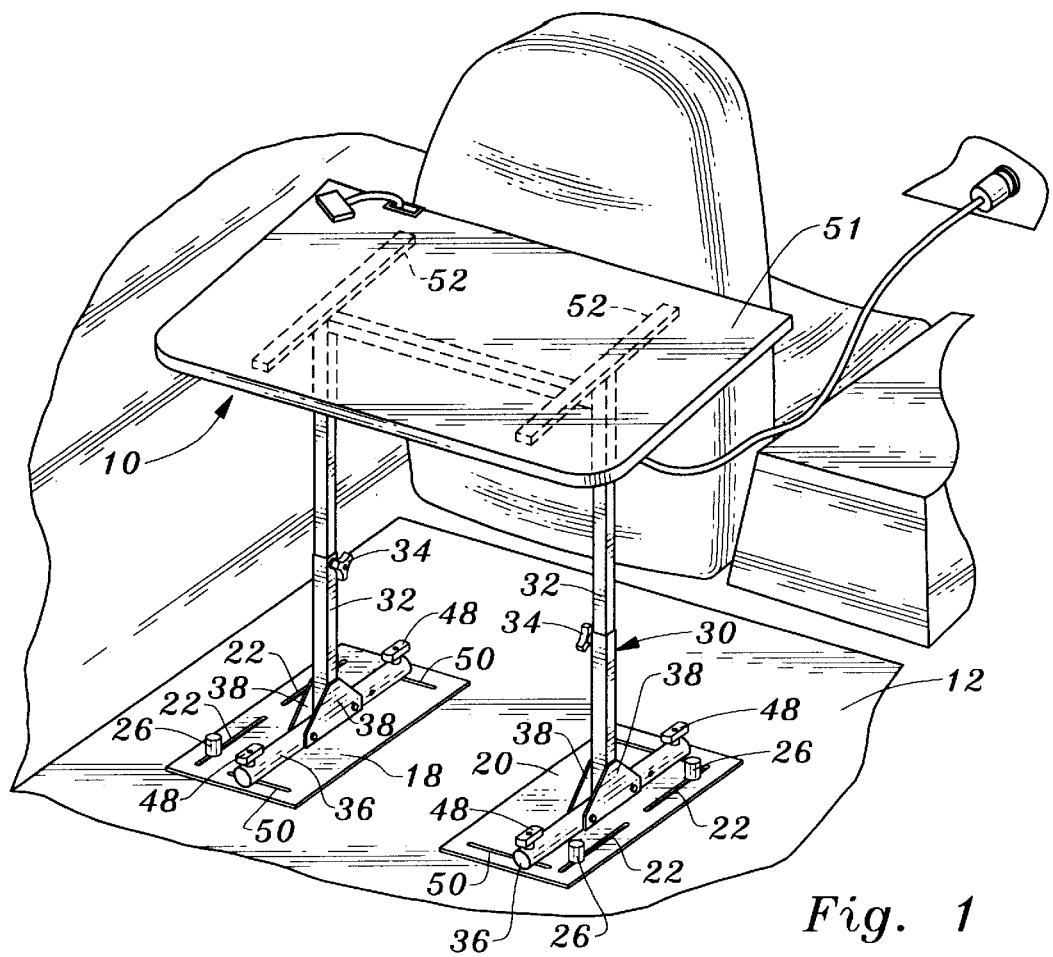
FIG. 1 is a perspective view of a preferred embodiment of the portable adjustable work table of the present invention in place within the interior of a vehicle and attached to the floor of the vehicle.
Figure 2:
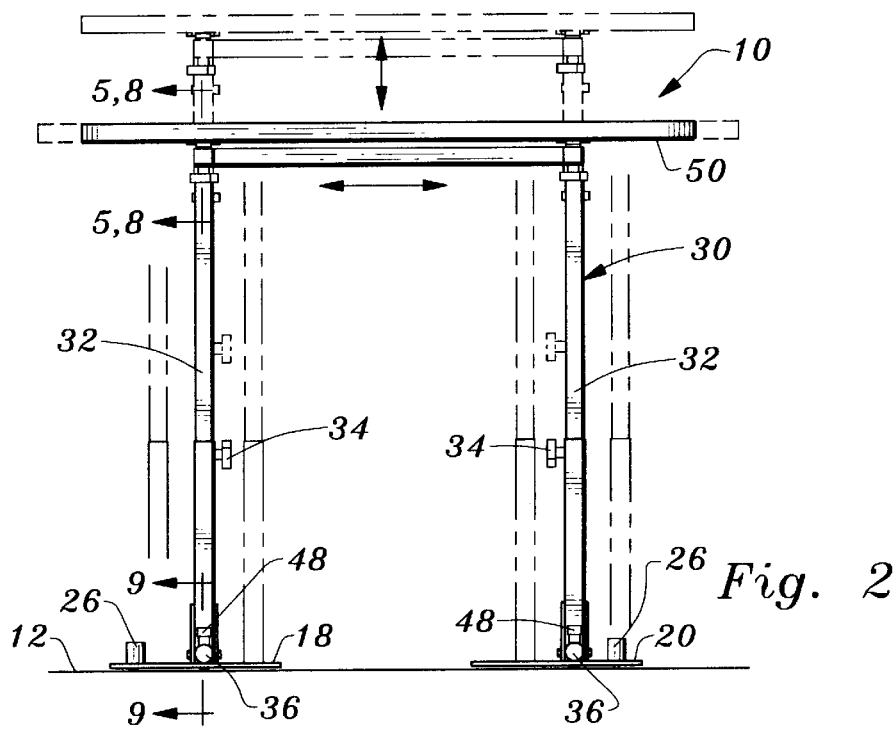
FIG. 2 is a front elevational view of the table illustrating alternative positions assumed by structural components thereof in solid and dash lines.
Figure 3:
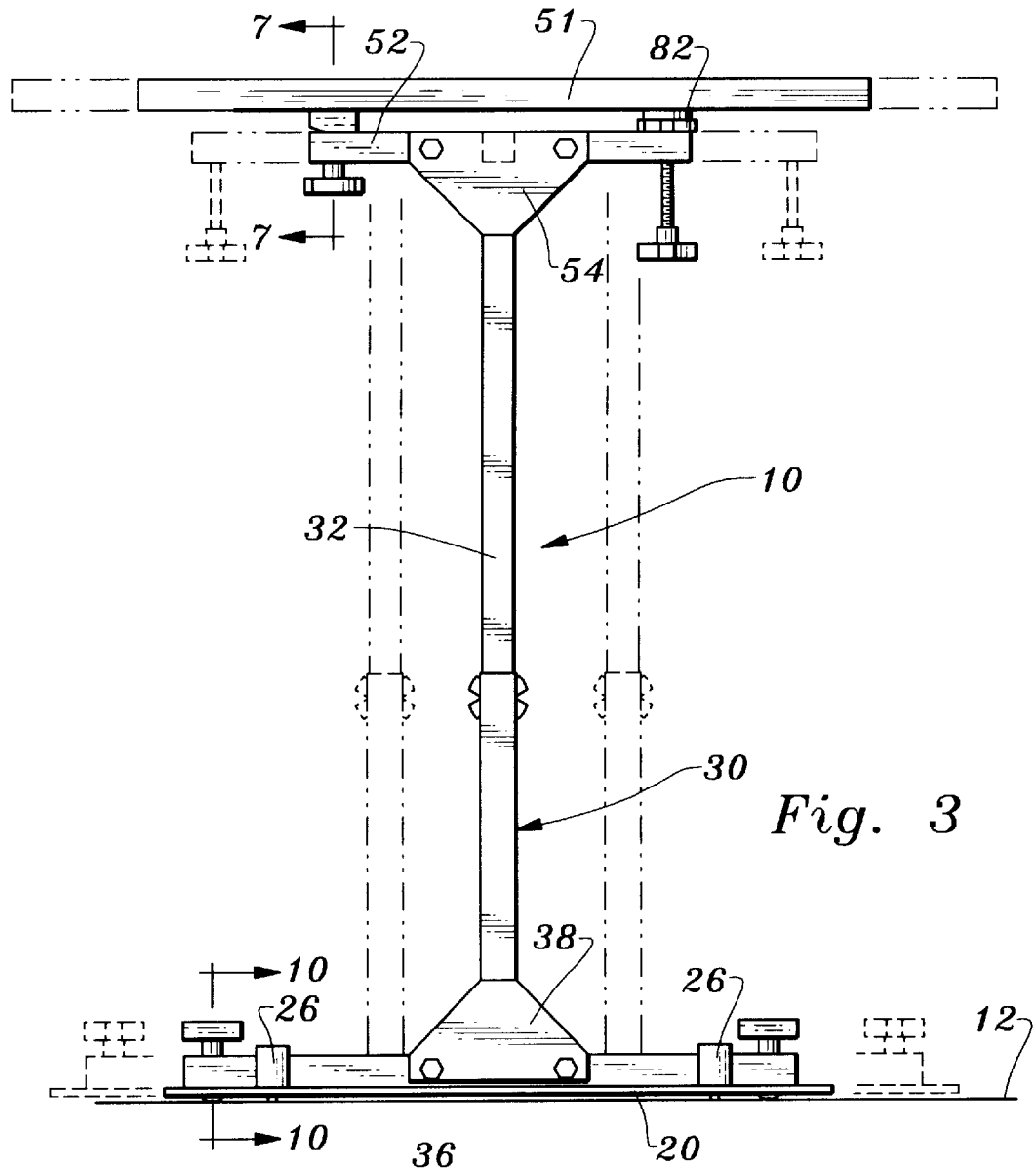
FIG. 3 is an enlarged side elevational view of the table showing alternative positions assumed by structural components thereof in solid and dash lines.
Figure 4:
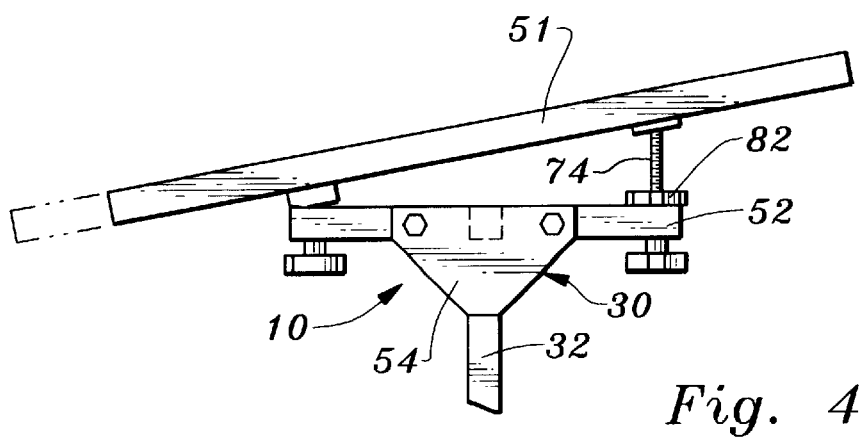
FIG. 4 is a side elevational view of the upper portion of the support frame and associated table top.

Referring now to the drawings, a portable adjustable work table constructed in accordance with the teachings of the present invention is identified by reference numeral 10. The work table 10 is for selective attachment to the floor 12 of a motor vehicle, such as a conversion van, motor home or other recreational vehicle.

Figure 9:
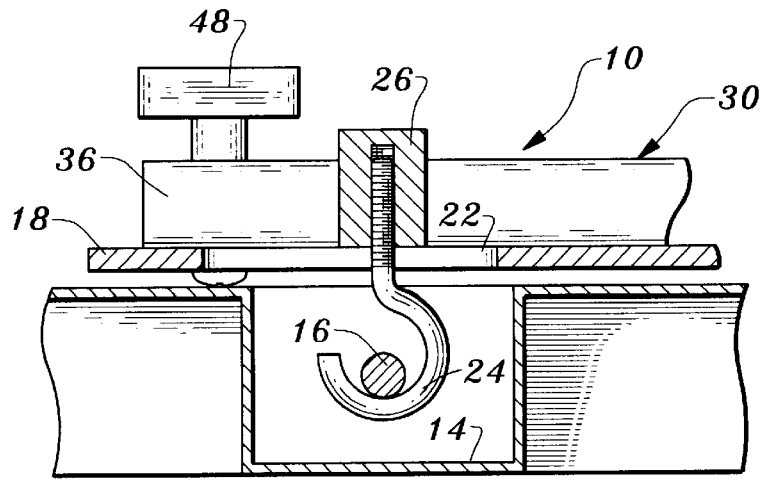
FIG. 9 is an enlarged cross-sectional view taken along the line 9—9 of FIG. 2.

The floor 12, as is conventional, has a plurality of vehicle seat securement wells or tubs formed therein, one of said wells being shown in FIG. 9 and identified by reference numeral 14. Positioned within each well is seat mounting structure in the form of a rod 16 (FIG. 9) extending across the well.

As indicated above, such structure is normally for the purpose of securing seats to the floor of the motor vehicle. The work table of the present invention is so constructed as to be cooperable with such structure to mount the work table in place after the vehicle seat has been disconnected from rod 16 and removed from the vehicle.

It will be appreciated that the positions and sizes of the wells or tubs employed to mount seats can vary from vehicle to vehicle. The portable adjustable work table of the present invention readily accommodates itself to these different layouts.

The disclosed work table includes two mounting plates 18, 20, each of which is located over two adjacent wells or tubs 13. Elongated slots 22 are formed in each of the mounting plates. Slidably positioned in each of the slots 22 is a securement element in the form of a hook 24 extending downwardly from the associated mounting plate and having a curved distal end engageable with a rod 16 in the well or tub. Each hook 24 is threaded at the upper end thereof and threadedly engaged by a securing knob 26.

The slots 22 allow the hooks therein to be slidably moved relative to the associated mounting plate to properly position the hook relative to the well and the seat mounting rod 16 disposed therein. After the hook has captured the rod, securing knob 26 is tightened against its associated mounting plate to maintain the mounting plate securely in place. In the arrangement illustrated, as noted above, each mounting plate has two sets of hooks and securing knobs associated therewith, each mounting plate being located over two adjacent wells 14. In the interest of simplicity, only one well is depicted in the drawings (FIG. 9).

A support frame 30 is connected to the mounting plates and extends upwardly therefrom. The support frame 30 includes two frame legs 32, each comprising telescoping upper and lower leg segments which may be selectively telescoped or extended to change the height of the support frame. A manually operable clamp member 34 of any suitable type is employed to lock the frame leg segments against relative movement.

At the bottom thereof each leg 32 is attached to a tubular-shaped frame base member 36 disposed parallel to the upper surface of an associated mounting plate. Brace plates 38 are preferably employed to maintain a secure rigid inter-connection between the frame brace members and their associated frame legs.

Each frame base member 36 has a lower opening 40 (FIGS. 10 and 11) and an upper enlarged opening 42. An elongated connector 44 threaded at the upper end thereof extends through each set of upper and lower openings. Each connector has an enlarged end 46 bearing against the bottom of its associated mounting plate. The threaded upper end of each connector 44 projects upwardly from its associated frame base member and has a lock cap 48 threadedly engaged therewith.

Figure 10:
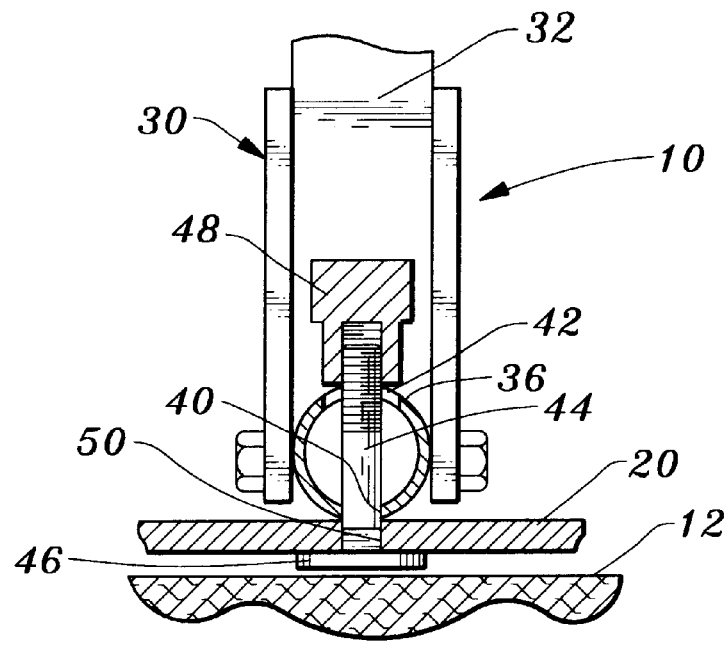
FIG. 10 is an enlarged cross-sectional view taken along the line 10—10 in FIG. 3.
Figure 11:
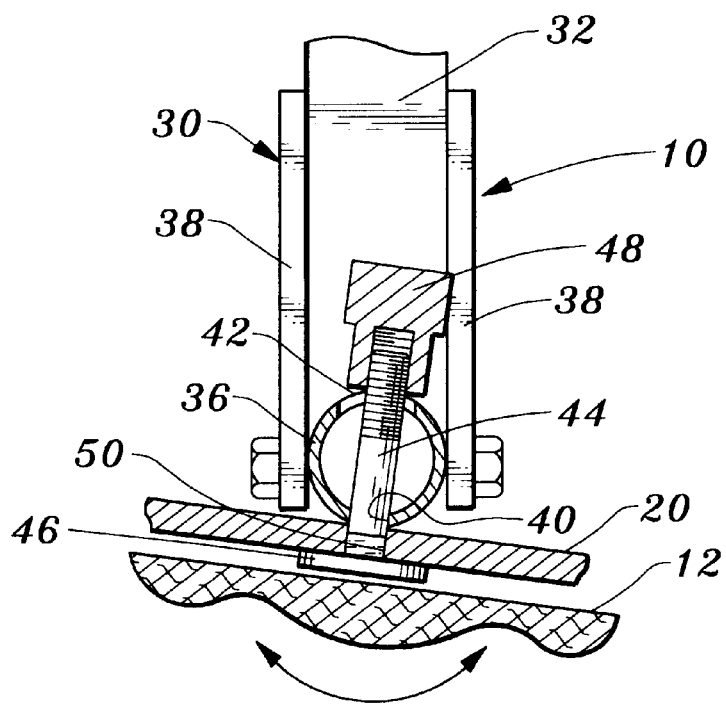
FIG. 11 is a view similar to FIG. 10 but illustrating the structural components in alternate relative positions.

As may perhaps best be seen with reference to FIGS. 10 and 11, the mounting plate and connector are free to pivot relative to the rest of the support frame when the lock cap associated therewith is not tightened to accommodate any variations in the inclination of the floor 12, the upper enlarged opening 42 allowing such movement. The objective, of course, is to maintain the frame legs 32 in substantially vertical orientation and after this is accomplished the lock caps 48 are tightened down into clamping engagement with the frame base members. The connectors 44 pass through slots 50 in the mounting plates so that the support frame may be slid sideways relative to the mounting plates to attain the desired position before the lock caps are tightened.

Work table 10 includes a table top 51 having an upper work surface. The table top 51 is located over two elongated support members 52 attached to the upper ends of frame legs 32 at brackets 54.

Downwardly opening channels 60 (FIGS. 5 through 8) are located at the bottom of the table top. There are two such channels and they are disposed parallel to one another and oriented front to rear or fore and aft of the table top. Slidably positioned in each channel 60 is a bearing block 62 located at the front of the table top and a support block 64 located toward the rear of the table top.

Figure 5:
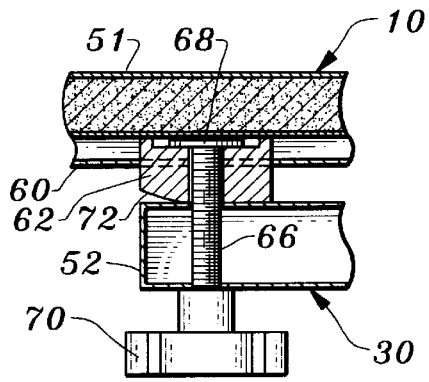
FIG. 5 is a greatly enlarged cross-sectional view taken along the line 5—5 in FIG. 2 and illustrating selected structural component in predetermined relative positions.
Figure 6:
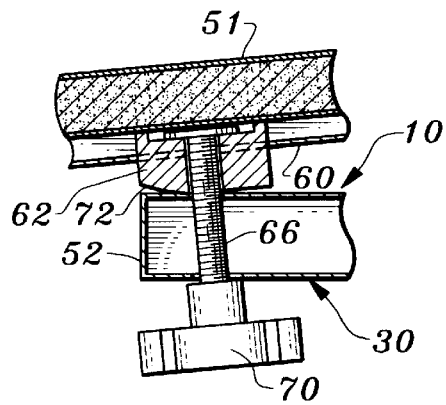
FIG. 6 is a view similar to FIG. 5 illustrating the structural components disposed in other relative positions.
Figure 7:
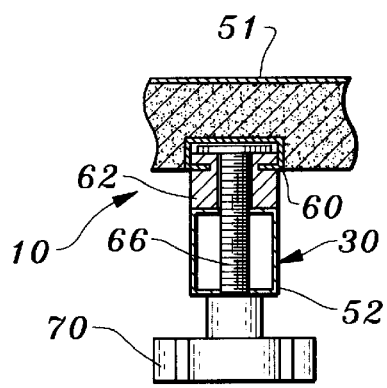
FIG. 7 is an enlarged cross-sectional view taken along the line 7—7 in FIG. 3.
Figure 8:
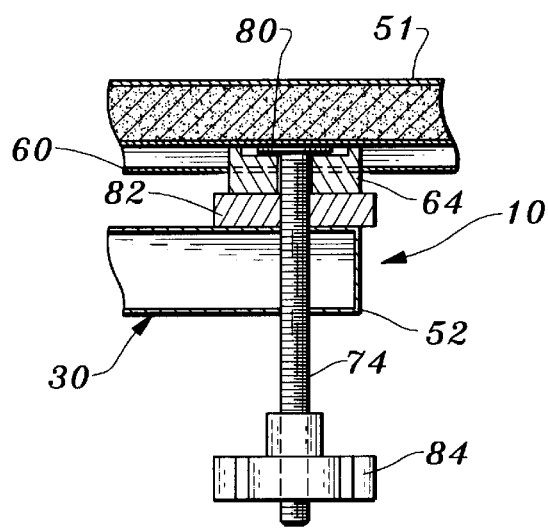
FIG. 8 is an enlarged cross-sectional view taken along the line 8—8 in FIG. 2.

Extending through each support member 52 and each bearing block 62 is an elongated adjustment member 66 threaded along the length thereof and having an enlargement 68 disposed within the confines of the bearing block and within its respective channel 60. A lock knob 70 is threadedly engaged with adjustment member 66. Bearing block 62 has a curved outer surface 72 to facilitate tilting of the bearing block and table top as shown in FIGS. 5 and 6. The adjustment member 66 is in the nature of a clamp which when loosened will allow the table top to be moved fore and aft. Rotation of the lock knob 70 will clamp the table top against sliding movement.

As indicated above, the table top is also slidably movable relative to the support blocks 64 disposed in channels 60. Each support block 64 has a throughbore formed therein through which passes an elongated adjustment member 74 employed to change the angle of inclination of the table top. Adjustment member 74 is threaded along the length thereof and passes downwardly through its associated support member 52. An upper enlarged end 80 of adjustment member 74 is captured within support block 64 to engage the underside of the table top.

An adjustment knob 82 is threadedly engaged with adjustment member 74 and rotation of the adjustment knob 82 will serve to either raise or lower the adjustment member 74 and thus the rear or aft end of table top 51. When the desired setting is attained, a support member 52 is clamped between adjustment knob 82 and a lower manually rotatable knob 84 to retain the table top at the desired degree of inclination.

The work table can be placed at various selected locations in a vehicle. For example, the table may be positioned in the locations normally occupied by either the middle or rear seats of a van. The person using the work table can sit in the other seat. The table can be readily adjusted for optimal ergonomic results, bearing in mind such factors as the physical characteristics of the individual using the work table and the seat upon which he or she is seated.

I claim:

1. A portable adjustable work table for selective attachment to the floor of a motor vehicle, said work table comprising, in combination:

mounting plate means for engagement with said floor;

securement means for selectively securing said mounting plate means to said floor;

a support frame connected to said mounting plate means and selectively adjustably movable relative to said mounting plate means extending upwardly from said mounting plate means; and a table top having a work surface connected to and supported by said support frame, said mounting plate means comprising a plurality of mounting plates positionable over vehicle seat securement wells located in said floor, said securement means comprising securement elements extending downwardly from said mounting plates and engageable with seat mounting structure in said vehicle seat securement wells, said securement elements being adjustably mounted relative to said mounting plates.

2. The portable adjustable work table according to claim 1 wherein said securement elements comprise hooks having distal ends engageable within said seat mounting structure in said vehicle seat securement wells.

3. The portable adjustable work table according to claim 2 including fastener means engageable with said hooks and with said mounting plates to selectively maintain the distal ends of said hooks in engagement with said seat mounting structure.

4. The portable adjustable work table according to claim 1 wherein said table top is selectively pivotally adjustable relative to said support frame, said portable adjustable work table additionally comprising adjustment means for selectively pivotally adjusting the inclination of said table top relative to said support frame, said adjustment means comprising at least one elongated adjustment member movably connected to said support frame and having an upper end engaging said table top at a predetermined location on said table top, said portable adjustable work table further including locking means for selectively locking said support frame and said table top against relative pivotal movement.

5. The portable adjustable work table according to claim 4 wherein said elongated adjustment member is threadedly engaged with said support frame and wherein said locking means includes at least one lock element threadedly engaged with said elongated adjustment member and engageable with said support frame.

6. The portable adjustable work table according to claim 4 wherein said adjustment means additionally includes a bearing member disposed between said table top and said support frame at a location spaced from said predetermined location, said table top being pivotal about said bearing member.

7. The portable adjustable work table according to claim 1 including means for adjusting the height of said support frame.

8. A portable adjustable work table for selective attachment to the floor of a motor vehicle, said work table comprising, in combination:

mounting plate means for engagement with said floor;

securement means for selectively securing said mounting plate means to said floor;

a support frame connected to said mounting plate means and selectively adjustably movable relative to said mounting plate means extending upwardly from said mounting plate means; and a table top having a work surface connected to and supported by said support frame, said mounting plate means comprising a plurality of mounting plates positionable over vehicle seat securement wells located in said floor, said securement means comprising securement elements extending downwardly from said mounting plates and engageable with seat mounting structure in said vehicle seat securement wells, and said mounting plates defining slots, said securement elements being selectively movable in said slots for adjusting the positions of said securement elements relative to said seat mounting structure.

9. A portable adjustable work table for selective attachment to the floor of a motor vehicle, said work table comprising, in combination:

mounting plate means for engagement with said floor;

securement means for selectively securing said mounting plate means to said floor;

a support frame connected to said mounting plate means and selectively adjustably movable relative to said mounting plate means extending upwardly from said mounting plate means; and a table top having a work surface connected to and supported by said support frame, said support frame and said mounting plate means being pivotally connected and said support frame including at least one frame base member extending generally parallel to said mounting plate means, said portable adjustable work table including connector means interconnecting said mounting plate means and said frame base member, and said connector means being pivotal relative to said frame base member.

10. The portable adjustable work table according to claim 9 wherein said frame base member defines an opening for receiving said connector means and allowing selective pivotal movement of said connector means and said frame base member.

11. The portable adjustable work table according to claim 10 additionally including a lock for selectively locking said connector means and said mounting plate means against pivotal movement relative to said frame base member.

12. The portable adjustable work table according to claim 9 wherein said mounting plate means includes at least one elongated adjustment opening and wherein said connector means is slidably located in said elongated adjustment opening to permit slidable movement of said frame base member relative to said mounting plate means, said portable adjustable work table additionally comprising means for selectively locking said frame base member and said connector means against slidable movement relative to said mounting plate means.

13. A portable adjustable work table for selective attachment to the floor of a motor vehicle, said work table comprising, in combination:

mounting plate means for engagement with said floor;

securement means for selectively securing said mounting plate means to said floor;

a support frame connected to said mounting plate means and selectively adjustably movable relative to said mounting plate means extending upwardly from said mounting plate means; and a table top having a work surface connected to and supported by said support frame, said table top being selectively pivotally adjustable relative to said support frame, said portable adjustable work table additionally comprising adjustment means for selectively pivotally adjusting the inclination of said table top relative to said support frame, said adjustment means comprising at least one elongated adjustment member movably connected to said support frame and having an upper end engaging said table top at a predetermined location on said table top, said portable adjustable work table further including locking means for selectively locking said support frame and said table top against relative pivotal movement, said elongated adjustment member being threadedly engaged with said support frame and said locking means including at least one lock element threadedly engaged with said elongated adjustment member and engageable with said support frame, said adjustment means additionally including a bearing member disposed between said table top and said support frame at a location spaced from said predetermined location, said table top being pivotal about said bearing member.

14. The portable adjustable work table according to claim 13 wherein said table top is slidable relative to said elongated adjustment member and relative to said bearing block to selectively position said table top fore and aft relative to said support frame.

15. The portable adjustable work table according to claim 14 wherein said table top includes channels slidably receiving said elongated adjustment member and said bearing block.

16. The portable adjustable work table according to claim 13 wherein said bearing member has a curved outer surface engageable with said support frame to facilitate tilting of said table top relative to said support frame.

17. The portable adjustable work table according to claim 13 wherein said table top is selectively slidable relative to said bearing block, said portable adjustable work table including means for selectively locking said table top and said bearing block against relative movement.

18. The portable adjustable work table according to claim 17 wherein said means for selectively locking said table top and said bearing block against relative movement comprises a clamp movably mounted on said support frame, extending through said bearing block, and engageable with said table top.

* * * * *